United States Patent [19]

Kawashima et al.

[11] 4,338,403

[45] Jul. 6, 1982

[54] DIELECTRIC CERAMICS

[75] Inventors: Syunichiro Kawashima, Nishinomiya; Masamitsu Nishida; Ichiro Ueda, both of Osaka; Hiromu Ouchi, Toyonaka, all of Japan

[73] Assignee: Matsushita Electric Industrial Co., Ltd., Kadoma, Japan

[21] Appl. No.: 265,708

[22] Filed: May 21, 1981

[30] Foreign Application Priority Data

May 23, 1980 [JP] Japan .................................. 55-69403
Jul. 17, 1980 [JP] Japan .................................. 55-98375

[51] Int. Cl.³ ..................... C04B 35/46; C04B 35/50; H01B 3/12
[52] U.S. Cl. ................................... 501/136; 501/137; 501/139; 501/152
[58] Field of Search ................ 501/136, 137, 152, 139

[56] References Cited

U.S. PATENT DOCUMENTS 3,268,783 8/1966 Saburi ................................. 501/139
3,938,064 2/1976 O'Bryan et al. ..................... 501/137

FOREIGN PATENT DOCUMENTS 2848693 5/1979 Fed. Rep. of Germany ...... 501/136
50-20280 7/1975 Japan ................................... 501/139
51-44110 4/1976 Japan ................................... 501/139

*Primary Examiner*—Helen M. McCarthy
*Attorney, Agent, or Firm*—Stevens, Davis, Miller & Mosher

[57] ABSTRACT

A dielectric ceramic consisting essentially of at least 88 weight % of a main component and up to 12 weight % of stannic oxide ($SnO_2$), said main component consisting essentially of 34.5 to 82 weight % of titanium oxide ($TiO_2$), 9 to 63 weight % of Praseodymium oxide ($Pr_6O_{11}$) and 2.5 to 23.5 weight % of barium oxide (BaO), at most 95 weight % of said praseodymium oxide being replaceable by neodymium oxide ($Nd_2O_3$).

It exhibits large dielectric constant and low microwave loss with large temperature-stability for resonant frequency and it is suitable for use as dielectric resonators, electrical filters, substrates, etc.

2 Claims, No Drawings

DIELECTRIC CERAMICS

This invention relates to dielectric materials for use in the microwave region.

The primary object of this invention is to provide an improved ceramic material for a dielectric resonator, which has a high dielectric constant ($\epsilon_r$) and, when used as a dielectric resonator in the microwave region, exhibits a high unloaded Q and a small temperature coefficient ($\tau_f$) of resonant frequency which can be varied in a broad range by varying the composition.

In the region of microwave frequencies, dielectrics have conventionally been utilized in impedance matching and dielectric resonators. With the recent progress in the microwave field, particularly in the technology of integrated microwave circuit, efforts are being made actively in the interested circle to promote miniaturization by utilizing a dielectric resonator, in which dielectric ceramics with a high dielectric constant and low loss are used, to stabilize the frequency of an oscillator. For the above purpose, there have been used, in most of the cases, dielectric ceramics of the BaO-TiO$_2$ type, or those in which a part of the constituent of said type is replaced by other elements, or combinations thereof with those having a negative temperature coefficient of dielectric constant. These dielectric ceramics, however, present problems such that the dielectric constant or unloaded Q is not sufficiently high for practical use.

The present inventors conducted various experiments on the dielectric ceramics to eliminate the above defects and, as a result, have found that a ceramic material having the composition consisting essentially of 34.5 to 82 weight % of TiO$_2$, 9 to 63 weight % of Pr$_6$O$_{11}$ and 2.5 to 23.5 weight % of BaO is an excellent dielectric material for use in the microwave region, and that said composition may be modified by replacing 95 weight % or less of Pr$_6$O$_{11}$ with neodymium oxide or by adding 12 weight % or less of SnO$_2$.

The invention is illustrated below with reference to Examples.

EXAMPLE 1

Powdered TiO$_2$, Pr$_6$O$_{11}$, Nd$_2$O$_3$ and BaCO$_3$, used as starting materials, were weighed in accordance with the predetermined formulation and charged together with purified water into a rubber-lined ball mill charged with agate balls. After having been wet-milled for 24 hours, the mixture was dried, molded into a disk under a pressure of 400 kg/cm$^2$, and calcined in the air at 900° C. for 2 hours. The calcined powders were again charged together with purified water in the same ball mill as used above and wet-ground for 24 hours. After having been dried, the ground material was admixed with 3 weight % of a polyvinyl alcohol solution and granulated by means of a 30-mesh sieve. The granules were molded under a pressure of 800 kg/cm$^2$ into a disk of 20 mm in diameter and about 8 to about 12 mm in thickness, and fired at a temperature of 1,200° to 1,500° C. for 2 hours. In the same manner as described above, there were obtained specimens of various compositions as shown in Table 1. The resonant frequency and unloaded Q of each specimen were measured by using the specimen as a microwave dielectric resonator. The dielectric constant was determined by calculation from the resonant frequency and dimensions of the specimen. $\tau_f$ was determined from the measurements of temperature dependence of the resonant frequency in the range of from −30° to 70° C. The resonant frequency was 2 to 3 GHz.

EXAMPLE 2

TiO$_2$, Pr$_6$O$_{11}$, Nd$_2$O$_3$ and BaCO$_3$, used as starting materials, were weighed according to the predetermined formulation. The preparation and measurements of ceramic specimens were carried out in the same manner as in Example 1. The compositions and characteristics of the ceramic specimens were as shown in Table 2.

As is apparent from Tables 1 and 2, the dielectric ceramics of this invention exhibit large values of unloaded Q and dielectric constant in the microwave region and the value of $\tau_f$ can be varied by varying the composition. Consequently, they are useful for the stabilization of temperature dependence of an oscillator or a resonator and permit production of a compact and high performance microwave circuit at low cost.

The value of Q becomes low (100 or below), if TiO$_2$ is below 34.5 weight % or BaO exceeds 23.5 weight %. The dielectric constant becomes low, if the sum of praseodymium oxide and neodymium oxide is above 23.5 weight % or barium oxide is below 2.5 weight %, while Q becomes low, if the sum of praseodymium oxide and neodymium becomes below 9 weight %. The addition of SnO$_2$ in excess of 12 weight % decreases the dielectric constant. The upper limit of TiO$_2$ is set at 82 weight % in this invention, because $\tau_f$ becomes large above this limit.

Tables 1 and 2 show clearly that the ceramic composition as herein specified has marvelous performance characteristics and is of great utility value from the industrial viewpoint.

TABLE 1

| Sample No. | Composition (weight %) | | | | Sum of Nd$_2$O$_3$ and Pr$_6$O$_{11}$ (wt. %) | Amount replaced by Nd$_2$O$_3$ (wt. %) | $\epsilon_r$ | Q | $\tau_f$ (ppm/°C.) |
|---|---|---|---|---|---|---|---|---|---|
| | TiO$_2$ | Nd$_2$O$_3$ | Pr$_6$O$_{11}$ | BaO | | | | | |
| 1 | 34.5 | 31.5 | 31.5 | 2.5 | 63 | 50 | 55 | 750 | −75 |
| 2 | 39.5 | 29 | 29 | 2.5 | 58 | 50 | 61 | 820 | −22 |
| 3 | 35 | 24.5 | 24.5 | 16 | 49 | 50 | 53 | 1010 | +80 |
| 4 | 39.5 | 35.4 | 15.1 | 10 | 50.5 | 70 | 72 | 1550 | +42 |
| 5 | 42 | 28.7 | 12.3 | 17 | 41 | 70 | 95 | 2730 | +65 |
| 6 | 40 | 11 | 25.5 | 23.5 | 36.5 | 30 | 75 | 1520 | +56 |
| 7 | 50 | 27.3 | 11.7 | 11 | 39 | 70 | 98 | 4200 | +132 |
| 8 | 63 | 23.8 | 10.2 | 3 | 34 | 70 | 72 | 4140 | +194 |
| 9 | 53 | 20.3 | 8.7 | 18 | 29 | 70 | 101 | 3920 | +141 |
| 10 | 59.5 | 12.5 | 12.5 | 15.5 | 25 | 50 | 91 | 2350 | +163 |
| 11 | 69.5 | 6.8 | 15.7 | 8 | 22.5 | 30 | 98 | 3500 | +226 |
| 12 | 81.5 | 7.5 | 7.5 | 3.5 | 15 | 50 | 100 | 1750 | +245 |
| 13 | 74 | 4.5 | 4.5 | 17 | 9 | 50 | 89 | 1730 | +293 |
| 14 | 82 | 4.8 | 4.7 | 8.5 | 9.5 | 50 | 91 | 1840 | +266 |
| 15 | 42 | 39 | 2 | 17 | 41 | 95 | 90 | 2350 | +77 |

TABLE 1-continued

| Sample No. | Composition (weight %) | | | | Sum of Nd$_2$O$_3$ and Pr$_6$O$_{11}$ (wt. %) | Amount replaced by Nd$_2$O$_3$ (wt. %) | $\epsilon_r$ | Q | $\tau_f$ (ppm/°C.) |
|---|---|---|---|---|---|---|---|---|---|
| | TiO$_2$ | Nd$_2$O$_3$ | Pr$_6$O$_{11}$ | BaO | | | | | |
| 16 | 42 | 36.9 | 4.1 | 17 | 41 | 90 | 91 | 2410 | +77 |
| 17 | 48 | 18.1 | 18.9 | 15 | 37 | 49 | 91 | 2550 | +89 |
| 18 | 46 | 3.9 | 35.1 | 15 | 39 | 10 | 91 | 2330 | +105 |
| 19 | 51 | 1.8 | 33.2 | 14 | 35 | 5 | 93 | 2440 | +112 |

TABLE 2

| Sample No. | Composition (wt. %) | | Sum of Nd$_2$O$_3$ and Pr$_6$O$_{11}$ | Amount of Pr$_6$O$_{11}$ replaced by Nd$_2$O$_3$ (wt. %) | SnO$_2$ (wt. %) | $\epsilon_r$ | Q | $\tau_f$ (ppm/°C.) |
|---|---|---|---|---|---|---|---|---|
| | TiO$_2$ | BaO | Pr$_6$O$_{11}$ | | | | | |
| 1 | 48 | 15 | 37 | 49 | 2 | 90 | 2960 | 53 |
| 2 | 48 | 15 | 37 | 49 | 4 | 87 | 3300 | 39 |
| 3 | 48 | 15 | 37 | 49 | 8 | 87 | 2880 | 35 |
| 4 | 48 | 15 | 37 | 49 | 12 | 79 | 2100 | 21 |
| 5 | 34.5 | 2.5 | 63 | 50 | 6 | 53 | 1010 | −55 |
| 6 | 39.5 | 2.5 | 58 | 50 | 6 | 59 | 1200 | −10 |
| 7 | 35 | 16 | 49 | 50 | 6 | 50 | 1510 | 34 |
| 8 | 39.5 | 10 | 50.5 | 70 | 6 | 69 | 1970 | 23 |
| 9 | 42 | 17 | 41 | 70 | 4 | 88 | 3290 | 31 |
| 10 | 40 | 23.5 | 36.5 | 30 | 4 | 73 | 1950 | 35 |
| 11 | 50 | 11 | 39 | 70 | 6 | 90 | 4500 | 83 |
| 12 | 63 | 3 | 34 | 70 | 4 | 68 | 4220 | 144 |
| 13 | 53 | 18 | 29 | 70 | 8 | 85 | 4160 | 95 |
| 14 | 59.5 | 15.5 | 25 | 50 | 4 | 87 | 2980 | 91 |
| 15 | 69.5 | 8 | 22.5 | 30 | 6 | 88 | 3770 | 142 |
| 16 | 81.5 | 3.5 | 15 | 50 | 6 | 90 | 1980 | 166 |
| 17 | 74 | 17 | 9 | 50 | 4 | 83 | 1990 | 215 |
| 18 | 82 | 8.5 | 9.5 | 50 | 4 | 87 | 2320 | 193 |
| 19 | 50 | 11 | 39 | 70 | 12 | 81 | 3150 | 50 |
| 20 | 63 | 3 | 34 | 70 | 2 | 71 | 4520 | 161 |
| 21 | 42 | 17 | 41 | 95 | 4 | 86 | 2870 | 44 |
| 22 | 42 | 17 | 41 | 90 | 4 | 85 | 2900 | 61 |
| 23 | 46 | 15 | 39 | 10 | 4 | 88 | 2810 | 75 |
| 24 | 51 | 14 | 35 | 5 | 4 | 89 | 2900 | 88 |

What is claimed is:

1. A dielectric ceramic consisting essentially of 34.5 to 82 weight % of titanium oxide (TiO$_2$), 9 to 63 weight % of praseodymium oxide (Pr$_6$O$_{11}$) and 2.5 to 23.5 weight % of barium oxide (BaO), at most 96 weight % of said praseodymium oxide being replaceable by neodymium oxide (Nd$_2$O$_3$).

2. A dielectric ceramic consisting essentially of at least 88 weight % of a main component and up to 12 weight % of stannic oxide (SnO$_2$), said main component consisting essentially of 34.5 to 82 weight % of titanium oxide (TiO$_2$), 9 to 63 weight % of praseodymium oxide (Pr$_6$O$_{11}$) and 2.5 to 23.5 weight % of barium oxide (BaO), at most 95 weight % of said praseodymium oxide being replaceable by neodymium oxide (Nd$_2$O$_3$).

* * * * *